(12) United States Patent
Deng et al.

(10) Patent No.: US 9,453,741 B2
(45) Date of Patent: Sep. 27, 2016

(54) NAVIGATION SYSTEM WITH INDEXED TERM SEARCHING AND METHOD OF OPERATION THEREOF

(75) Inventors: Kan Deng, Beijing (CN); Yueyu Lin, San Jose, CA (US); Yanyan Qin, Beijing (CN)

(73) Assignee: Telenav, Inc., Santa Clara, CA (US)

( * ) Notice: Subject to any disclaimer, the term of this patent is extended or adjusted under 35 U.S.C. 154(b) by 368 days.

(21) Appl. No.: 12/752,086

(22) Filed: Mar. 31, 2010

(65) Prior Publication Data
US 2011/0246478 A1    Oct. 6, 2011

(51) Int. Cl.
G01C 21/36    (2006.01)
G06F 17/30    (2006.01)

(52) U.S. Cl.
CPC ..... G01C 21/3679 (2013.01); G06F 17/30241 (2013.01)

(58) Field of Classification Search
CPC ............... G01C 21/3679; G06F 17/30241
USPC .......................... 701/200, 532; 707/724, 743
See application file for complete search history.

(56) References Cited

U.S. PATENT DOCUMENTS

| | | | |
|---|---|---|---|
| 6,091,956 A | 7/2000 | Hollenberg | |
| 6,950,828 B2* | 9/2005 | Shaw et al. | 707/743 |
| 6,954,764 B2 | 10/2005 | Biswas et al. | |
| 7,117,199 B2 | 10/2006 | Frank et al. | |
| 7,266,560 B2 | 9/2007 | Lampert et al. | |
| 2001/0039546 A1 | 11/2001 | Moore et al. | |
| 2003/0112156 A1* | 6/2003 | Behr et al. | 340/995.2 |
| 2004/0073538 A1 | 4/2004 | Leishman et al. | |
| 2006/0200442 A1 | 9/2006 | Parikh | |
| 2007/0083505 A1 | 4/2007 | Ferrari et al. | |
| 2007/0233649 A1 | 10/2007 | Wang et al. | |
| 2007/0271235 A1* | 11/2007 | Frank et al. | 707/3 |
| 2008/0040384 A1* | 2/2008 | Kuznetsov | 707/103 Y |
| 2008/0133124 A1* | 6/2008 | Sarkeshik | 701/201 |
| 2008/0281518 A1* | 11/2008 | Dozier et al. | 701/213 |
| 2010/0250578 A1 | 9/2010 | Athsani et al. | |

OTHER PUBLICATIONS

International Search Report for Application No. PCT/US2011/029812 dated May 17, 2011.

* cited by examiner

*Primary Examiner* — Jorge A Casanova
(74) *Attorney, Agent, or Firm* — IP Investment Law Group

(57) ABSTRACT

A method of operation of a navigation system includes: preconstructing an inverted term index having a nested spatial index of at least one location; providing a search term and a search range for searching the inverted term index; locating the search term in the inverted term index and having the nested spatial index bounded by the search range; and retrieving a location record linked to the nested spatial index and associated with the search term and the search range for displaying on a device.

20 Claims, 11 Drawing Sheets

NAVIGATION SYSTEM WITH INDEXED TERM SEARCHING AND METHOD OF OPERATION THEREOF

TECHNICAL FIELD

The present invention relates generally to a navigation system, and more particularly to a system for locating points of interest.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

As users adopt mobile location based service devices, new and old usage begin to take advantage of this new device space. There are many solutions to take advantage of this new device opportunity. One existing approach is to use location information to provide navigation services, such as a global positioning service (GPS) navigation system for a mobile device. Systems can display map information, navigate and display a route between two points, and enable other services on these devices. Systems can also display information about a location or point of interest, "POI", such as the nature of the POI, the location address, hours of operation of a business or public establishment, and other information which may be useful to a user of a location-based service.

In response to consumer demand, navigation systems are providing ever-increasing amounts of information requiring these systems to handle more and more data in a limited amount of time. The systems are also presenting the information in more sophisticated ways than previously.

Thus, a need remains for a navigation system that can efficiently present information. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: preconstructing an inverted term index having a nested spatial index of at least one location; providing a search term and a search range for searching the inverted term index; locating the search term in the inverted term index and having the nested spatial index bounded by the search range; and retrieving a location record linked to the nested spatial index and associated with the search term and the search range for displaying on a device.

The present invention provides a navigation system, including: a preconstruction module for preconstructing an inverted term index having a nested spatial index of at least one location; a request module for providing a search term and a search range for searching the inverted term index; a term locate module for locating the search term in the inverted term index and having the nested spatial index bounded by the search range; and a retrieval module for retrieving a location record linked to the nested spatial index and associated with the search term and the search range for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
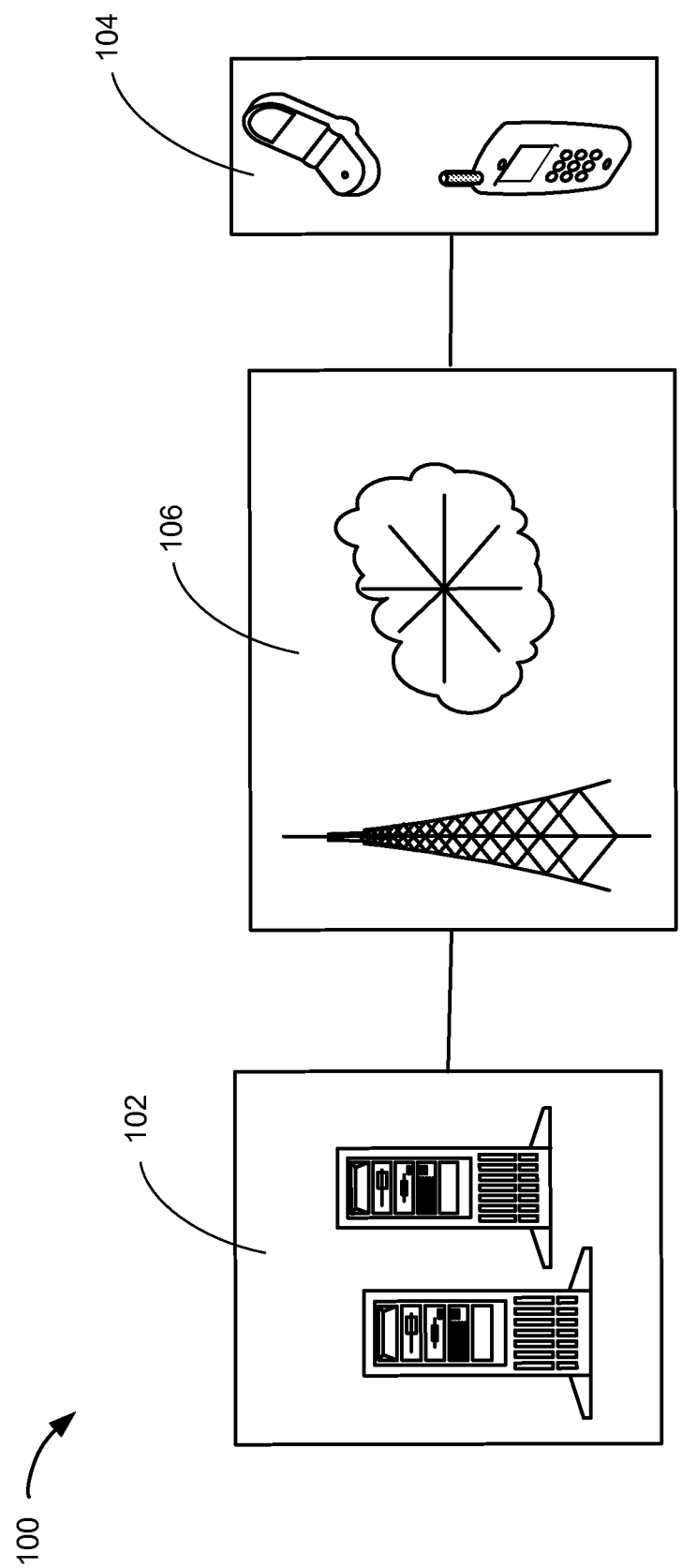
FIG. 1 is an example of an environment using an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (x, y), where x and y are two ordinates that define the geographic location, i.e. a position of a user.

The term "navigation location information" referred to herein is defined as information relating to points of interest to the user, such as local businesses, hours of business, types of business, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

Referring now to FIG. 1, therein is shown an example of an environment 100 using an embodiment of the present invention. The environment 100 applies to any embodiment of the present invention described later. The environment 100 includes a first device 102, such as a server or client. The first device 102 can be linked to a second device 104, such as a client or server, with a communication path 106, such as a network.

The first device 102 can be any of a variety of centralized or decentralized computing devices. For example, the first device 102 can be a computer, a computer in a grid computing pool, a virtualized computer, a computer in a cloud computing pool, or a computer in a distributed computing topology. The first device 102 can include routing functions or switching functions for coupling with the communication path 106 to communicate with the second device 104.

The second device 104 can be of any of a variety of mobile devices. For example, the second device 104 can be a cellular phone, personal digital assistant, a notebook computer, or other multi-functional mobile communication or entertainment devices having means for coupling to the communication path 106.

The communication path 106 can be a variety of networks. For example, the communication path 106 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the first device 102 is shown in a single location, although it is understood that the server can be centralized or decentralized and located at different locations. For example, the first device 102 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further for illustrative purposes, the environment 100 is shown with the second device 104 as a mobile computing device, although it is understood that the second device 104 can be different types of computing devices. For example, the second device 104 can be a mobile computing device, such as notebook computer, another client device, or a different type of client device.

Yet further for illustrative purposes, the environment 100 is shown with the first device 102 and the second device 104 as end points of the communication path 106, although it is understood that the environment 100 can have a different partition between the first device 102, the second device 104, and the communication path 106. For example, the first device 102, the second device 104, or a combination thereof can also function as part of the communication path 106.

Figure 2:
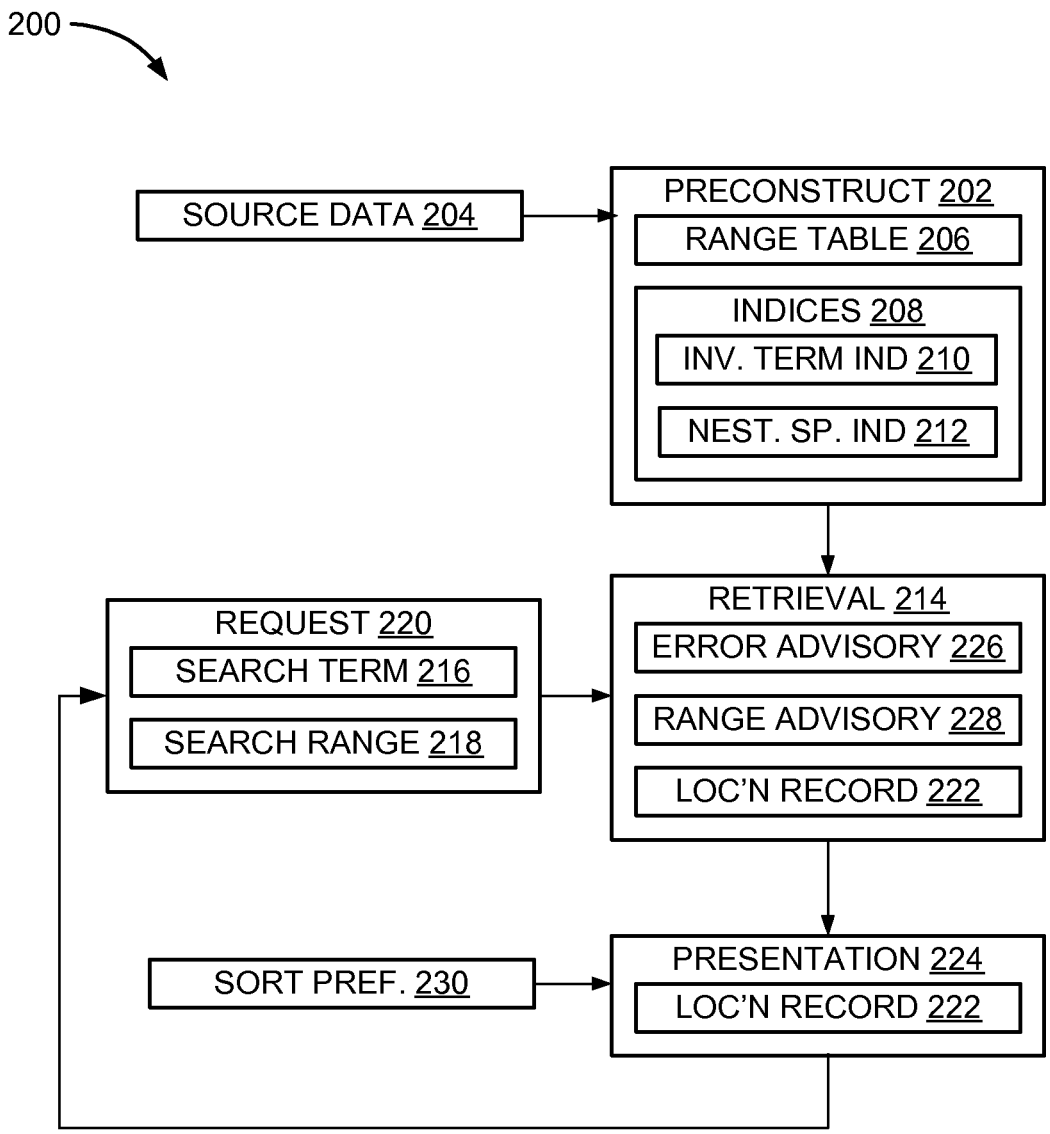
FIG. 2 is a flow chart of a navigation system with indexed term searching in a first embodiment of the present invention.

Referring now to FIG. 2, therein is shown a flow chart of a navigation system 200 with indexed term searching in a first embodiment of the present invention. The navigation system 200 can include modules with the functions of the navigation system 200.

The navigation system 200 can have a preconstruction module 202, which can receive source data 204. The source data 204 can be a collection of information, such as navigation location information for the use of the navigation system 200. The source data 204 can be provided from an outside vendor or other provider, and can be pre-loaded into a storage element of the navigation system 200. If the source data 204 is modified, the navigation system 200 can receive an updated version of the source data 204.

The preconstruction module 202 can preconstruct indices 208, including an inverted term index 210 and a nested spatial index 212. The preconstruction module 202 can use the source data 204 to preconstruct the inverted term index 210 having the nested spatial index 212 of at least one location. The preconstruction module 202 can also generate a link from the nested spatial index 212 to a record list having a location record 222.

The inverted term index 210 can be a collection of expressions, such as names of points of interest, restaurants, museums, or businesses. The nested spatial index 212 can be a data tree consisting of locations where a term of the inverted term index 210 can be located. For example, an entry in the inverted term index 210 can be "Peet's Coffee". The term "Peet's Coffee" can have the nested spatial index 212 which can be an index of the geographic location of outlets of the business. If there are multiple outlets of Peet's Coffee, they can be included in the nested spatial index 212 associated with the term "Peet's Coffee" in the inverted term index 210.

The preconstruction module 202 can also preconstruct a range table 206 for selecting a sub-tree of the nested spatial index 212 bounded by a search range 218. The range table 206 can be a lookup chart, which can give a minimum set of nodes of the nested spatial index 212 covering a spatial range, such as the search range 218. When the navigation system 200 operates a search for a point of interest, the navigation system 200 can restrict the search to the minimum set of nodes of the nested spatial index 212 corresponding to a spatial range expressed as the search range 218.

For all embodiments of the present invention, preconstructing the range table 206 or the indices 208 can mean that the range table 206 or the indices 208 can be built by the preconstruction module 202 of the navigation system 200 in advance of a search by the navigation system 200. The preconstruction module 202 does not need to operate each time the navigation system 200 receives a request for information.

The navigation system 200 can also have a retrieval module 214. The retrieval module 214 can receive a search term 216 and the search range 218 from a request module 220. The search term 216 can be an expression, such as a business name or point of interest name. The search range 218 can be a geographic area, in which the navigation system 200 can search for location instances associated with the search term 216. The retrieval module 214 can retrieve the location record 222 linked to the nested spatial index 212 and associated with the search term 216 and the search range 218 for displaying on a device with the navigation system 200.

The request module 220 can provide the search term 216 and the search range 218 for searching the inverted term index 210. The request module 220 can send the search term 216 and the search range 218 to the retrieval module 214. The request module 220 can receive the search term 216 and the search range 218 from a device such as a user interface.

For example, the navigation system 200 can receive a request for a location of Peet's Coffee within a certain city. The term "Peet's Coffee" can be entered as the search term 216 and the city as the search range 218. The request module 220 can provide the search term 216 and the search range 218, and can send them to the retrieval module 214. The retrieval module 214 can retrieve the location record 222, and can send the location record 222 to a presentation module 224. If more than one outlet is found matching the search term 216 in the search range 218, the retrieval module 214 can retrieve records for more than one outlet, and can send those records to the presentation module 224.

The search range 218 can be entered in a number of different ways. For example, the search range 218 can be entered as the name of a city or a neighborhood. Another example of the search range 218 can include spatial coordinates entered from a keyboard. A further example can include selecting an outline on a graphical representation of a map using a mouse and a display screen.

Another example of the search range 218 can be an area within a radius of a location, such as a current location reading (not shown) of the navigation system 200. A location unit of the navigation system 200 can obtain a location reading, and the retrieval module 214 can locate matching outlets of the search term 216 within the radius included with the search range 218. If the navigation system 200 changes its location, the search range 218 can be updated, as the location reading is updated in the navigation system 200, and the matching outlets can change. Correspondingly, the retrieval module 214 can retrieve an updated version of the location record 222 for display.

The retrieval module 214 can also generate an error advisory 226 for displaying on a device, if the search range 218 is invalid. For example, if the search range 218 is outside the geographic area associated with the information in the source data 204, the retrieval module 214 can generate the error advisory 226, and send the error advisory 226 to the presentation module 224.

The retrieval module 214 can also generate a range advisory 228 for displaying on a device. For example, if the navigation system 200 determines that there are no Peet's Coffee outlets within the search range 218, the retrieval module 214 can generate the range advisory 228, and can send the range advisory 228 to the presentation module 224.

The presentation module 224 can present the information of the navigation system 200 on an output such as a multimedia display, an audio display, a printer, a video screen, or a combination thereof. For example, the presentation module 224 can present the location record 222 on such an output, including the result of the search, which can be the outlets identified in the search range 218. The presentation module 224 can also display the error advisory 226, with a message advising that the selected range is not valid. The presentation module 224 can also display the range advisory 228, which can be generated by the retrieval module 214, if no relevant records were found associated with the search range 218.

The presentation module 224 can also receive a sort preference 230. The sort preference 230 can be an input to the navigation system 200 indicating a preference for the display of the results of a search. For example, a search may return the location record 222 or multiple versions thereof, which conform to the search term 216 and the search range 218. The presentation module 224 can sort the location record 222 according to the sort preference 230, and display the sorted results on a display. For example, the sort preference 230 can express a partiality for an order for a search result, such as a preferred alphabetical order of the addresses of the search result. As a further example, the sort can be operated according to the nearest location resulting from a search.

Figure 3:
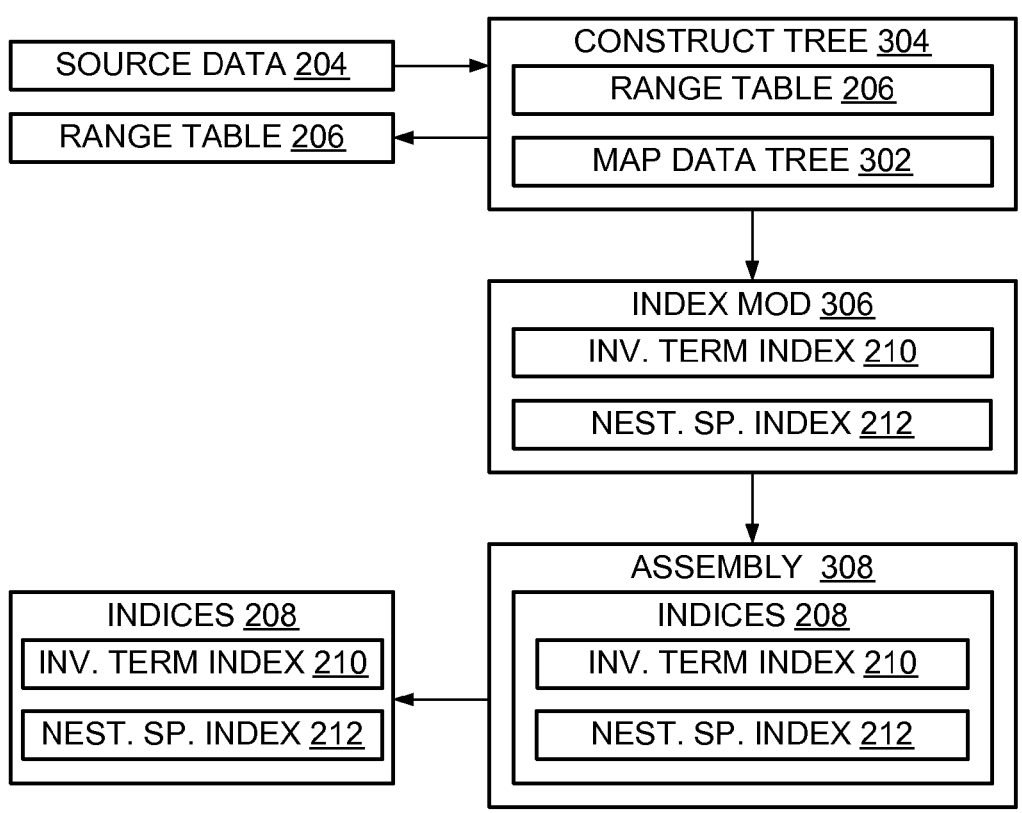
FIG. 3 is a flow chart of the preconstruction module of FIG. 2.

Referring now to FIG. 3, therein is shown a flow chart of the preconstruction module 202 of FIG. 2. The preconstruction module 202 can receive the source data 204, and can preconstruct the indices 208, a map data tree 302, and the range table 206. The indices 208 can include the inverted term index 210 with the nested spatial index 212.

A construct tree module 304 of the preconstruction module 202 can receive the source data 204. For the geographic region associated with the source data 204, the construct tree module 304 can preconstruct the map data tree 302 and the range table 206.

The map data tree 302 can be a structure which can uniquely identify location points of the region covered by the source data 204. For example, the map data tree 302 can be a quad-tree, which can include nodes, leaf nodes, and data points. Any node, leaf node, or data point, such as a business location, an intersection, a point of interest, or a recreation area, which is included with the source data 204, can have a unique identification in the map data tree 302. The construct tree module 304 can assign the tree-based identification to points of interest in the source data 204.

The map data tree 302 is adaptive, which can mean that the branches of the structure can be deep or shallow, as required to meet a criterion for data points in a leaf node. The map data tree 302 is spatial, which can mean that an identification of any part of the map data tree 302 can be associated with its geographic location. For example, the identification of a node, a leaf node, or a data point in the map data tree 302 can be unique, and can be a path through the map data tree 302 to the geographic location of the node, the leaf node, or the data point. The structure of the map data tree 302 and the identification of nodes, leaf nodes, and data points will be discussed in more detail.

The construct tree module 304 can also generate the range table 206 for translating the search range 218 of FIG. 2 into a sub-tree of the nested spatial index 212. The range table 206 can be a look-up listing for use in translating the search range 218 of FIG. 2 into an identification which can be associated with the position of the search range 218 in the nested spatial index 212.

The preconstruction module 202 can include an index module 306. The index module 306 can receive the map data tree 302, and can preconstruct the inverted term index 210 having the nested spatial index 212 of at least one location. The inverted term index 210 can be a listing of terms extracted from the map data tree 302. The inverted term index 210 is inverted, which means that for a term, the inverted term index 210 can have a reference to an information record of the term.

The index module 306 can also preconstruct the nested spatial index 212. A term of the inverted term index 210 can have a unique version of the nested spatial index 212. The index module 306 can generate a link from the nested spatial index 212 of each term of the inverted term index 210 to a record of information in the map data tree 302. The nested spatial index 212 can be a tree structure, such as the map data tree 302, such that any location or address in the source data 204 can have the same identification in the nested spatial index 212 of any term of the inverted term index 210.

The preconstruction module 202 can include an assembly module 308, which can receive the inverted term index 210 and the nested spatial index 212. The preconstruction module 202 can align the nested spatial index 212 with the appropriate term of the nested spatial index 212 in the indices 208. The preconstruction module 202 can return the range table 206 and the indices 208 with the inverted term index 210 and the nested spatial index 212.

In another embodiment of the present invention, a term index can be nested within a spatial index. In geographic regions with sparse populations or widely dispersed POI, nesting the term index within the spatial index can be more efficient. However, it has been discovered that for more populated regions, or regions with more condensed POI, the inverted term index 210 with the nested spatial index 212 can enable a more efficient search mechanism.

Figure 4:
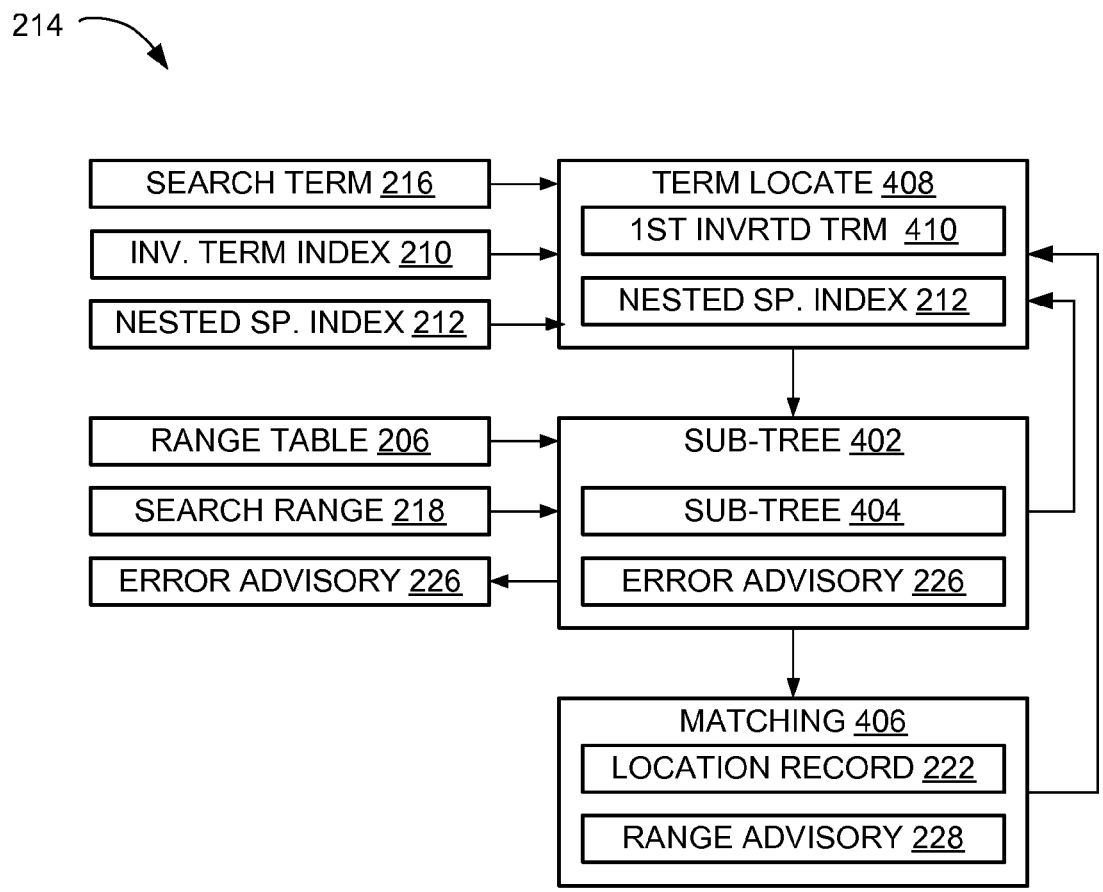
FIG. 4 is a flow chart of the retrieval module of FIG. 2.

Referring now to FIG. 4, therein is shown a flow chart of the retrieval module 214 of FIG. 2. The retrieval module 214 can receive the range table 206 from the preconstruction module 202 of FIG. 2. The retrieval module 214 can also receive the inverted term index 210 with the nested spatial index 212 from the preconstruction module 202. The retrieval module 214 can also receive the search term 216 and the search range 218, from the request module 220 of FIG. 2.

The retrieval module 214 can retrieve the location record 222 associated with the search term 216 and the search range 218 for displaying on a device. The location record 222 can include information about a data point of the source data 204 of FIG. 2. For example, for a location instance of Peet's Coffee, the location record 222 can include detailed information about the identified Peet's location. The detailed information can include, for example, the location, hours of operation, menu details, maximum seating configuration, or a combination thereof. The detailed information can also include other information pertinent to the identified Peet's location.

The retrieval module 214 can include a term locate module 408 for finding a term in the inverted term index 210. The term locate module 408 can receive the search term 216 from the request module 220 of FIG. 2. The term locate module 408 can also receive the inverted term index 210 and the nested spatial index 212 from the preconstruction module 202 of FIG. 2. The term locate module 408 can locate the search term 216 in the inverted term index 210 and having the nested spatial index 212 bounded by the search range 218, as a first inverted term 410. The first inverted term 410 can have the nested spatial index 212. The term locate module 408 can send the first inverted term 410 with the nested spatial index 212 to a sub-tree module 402.

The retrieval module 214 can include the sub-tree module 402. The sub-tree module 402 can receive the range table 206 and the search range 218. The sub-tree module 402 can compare the search range 218 with the range table 206. The sub-tree module 402 can select a sub-tree 404 of the nested spatial index 212 for restricting the search for the location record 222 to a portion of the nested spatial index 212. The sub-tree module 402 can select the sub-tree 404 of the nested spatial index 212 from the range table 206 by selecting a set of nodes of the nested spatial index 212 representing a geographic area bounded by the search range 218. The sub-tree 404 can represent the geographic territory covered by the search range 218 expressed as a portion of the nested spatial index 212.

The sub-tree module 402 can determine whether the search range 218 is a valid portion of the geographic territory covered by the source data 204. If the sub-tree module 402 determines that the search range 218 is not valid, the sub-tree module 402 can generate the error advisory 226 for displaying on a device.

For example, the source data 204 can cover the contiguous forty-eight states of the USA, and the map data tree 302 can cover the same territory. If the search range 218 is an area of another country, or a state that is not in the contiguous forty-eight, then the sub-tree module 402 can generate the error advisory 226 with a message that the search range 218 is outside the covered territory. The error advisory 226 can also include a request for an updated version of the search range 218.

If the sub-tree module 402 generates the error advisory 226, the sub-tree module 402 can wait for an updated version of the search range 218, or return to the term locate module 408. If the sub-tree module 402 selects the sub-tree 404, it can send the sub-tree 404 to a matching module 406.

The matching module 406 can receive the first inverted term 410 with the nested spatial index 212 from the term locate module 408. The matching module 406 can also receive the sub-tree 404 from the sub-tree module 402. The matching module 406 can traverse the nested spatial index 212 associated with the search term 216 to the sub-tree 404 of the nested spatial index 212. The matching module 406 can select the location record 222 in a record list in a link from the nested spatial index 212. The location record 222 can be a record of data, included with the source data 204 of FIG. 2, pertaining to a point of interest.

The matching module 406 can also omit the location record 222 of a location included in the sub-tree 404 and not included in the search range 218. The geographic boundary of the search range 218 can mismatch with the geographic boundary of the leaf nodes of the sub-tree 404.

For example, the search can be for the search term 216 "Peet's Coffee", and the search range 218 can be the city of Sunnyvale, Calif. The Sunnyvale city boundary can include part of a leaf node of the map data tree 302, while another part of the same leaf node can be in a different city. Under those circumstances, the search can identify a location which matches the search term 216 and is in the sub-tree 404, but is outside the search range 218. The matching module 406 can ignore records, which are outside the search range 218 while being inside the sub-tree 404.

The matching module 406 can also generate the range advisory 228 for displaying on a device. If the navigation system 200 of FIG. 2 determines that there are no instances of the search term 216 in the search range 218, the matching module 406 can generate the range advisory 228. The range advisory 228 can include a message that no locations were found in the search range 218. The range advisory 228 can also include a recommendation to try a different search range 218 or a different search term 216.

The matching module 406 can send the range advisory 228 or the location record 222 to the presentation module 224 of FIG. 2. Flow control of the navigation system 200 can go from the matching module 406 to the term locate module 408 to await a new search.

It has been discovered that the inverted term index 210 with the nested spatial index 212 provides faster means for spatial searching of geographic information. The navigation system 200 can select location instances which match the search term 216 and the search range 218, without reviewing record content for a match with the search term 216 and the search range 218.

The physical transformation of the search term 216 and the search range 218 into the location record 222 results in movement in the physical world, such as people using the navigation system 200 or vehicles, based on the operation of the navigation system 200. As the movement in the physical world occurs, the movement itself creates additional information that is converted back to the location record 222 for the continued operation of the navigation system 200 and to continue the movement in the physical world.

Figure 5:
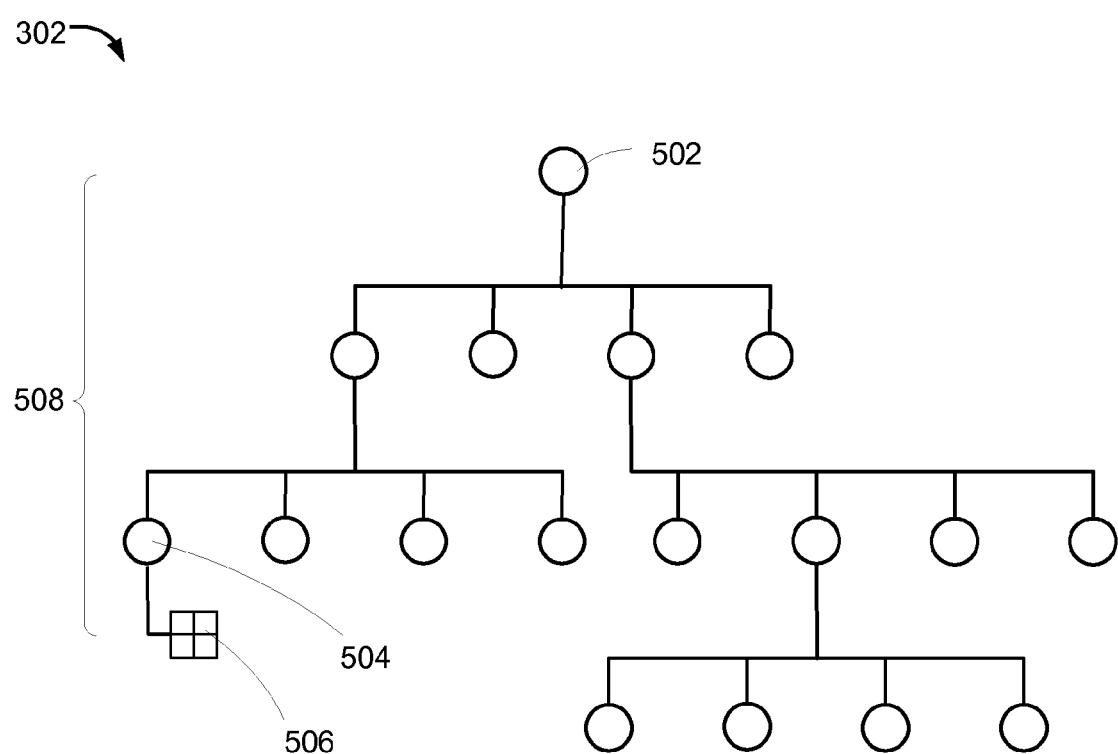
FIG. 5 is an illustration of a map data tree.

Referring now to FIG. 5, therein is shown an illustration of the map data tree 302. For illustrative purposes, the map data tree 302 is shown as a quad-tree, although it is understood that the map data tree 302 can be in the form of another encoding scheme for indexing multi-dimensional information. For example, the map data tree 302 can be an R-tree, or a KD-tree, or other encoding scheme which can provide an identification scheme for data within the structure. Also for illustrative purposes, the map data tree 302 is shown with a depth of five layers, although the number of layers can be different. For example, map data for the contiguous forty-eight states of the USA can occupy thirteen layers. As a further example, an eight-layer quadtree can represent metropolitan Beijing.

The map data tree 302 is shown with a root 502, shown as a circle common to all branches of the map data tree 302, representing the source data 204 of FIG. 2. The root 502 is divided into quadrants, or nodes, also shown as circles in FIG. 5. A node which is not further subdivided into nodes can include data points, and is known as a leaf node. As an example, FIG. 5 shows a first leaf node 504, which can include a data point such as a first location instance 506.

The data points, such as the first location instance 506, can be the physical position of an entity from the source data 204. For example, the first location instance 506 can be the location of a business, a point of interest, an intersection of two thoroughfares, or other data point with navigation location information in the source data 204.

The leaf nodes, such as the first leaf node 504, can include a maximum number of data points, such as the first location instance 506. For example, the leaf nodes of the map data tree 302 can have a maximum of two hundred fifty-six data points. This can be a useful criterion for a binary system, for example, as two-hundred and fifty-six can be represented by a byte of eight binary bits. The first leaf node 504 is shown with one data point, which is the first location instance 506, although it is understood that the first leaf node 504 can include up to the maximum number of data points.

The construct tree module 304 of FIG. 3 can preconstruct the map data tree 302. The leaf nodes of the map data tree 302 can be in different layers of the map data tree 302. For example, the first leaf node 504 is in the third layer of the map data tree 302, while other leaf nodes can reside in layers at the same or other depths of the map data tree 302.

The effect on the map data tree 302 can be that different leaf nodes of the map data tree 302 represent different sized geographical areas of the source data 204. For example, if the first leaf node 504 represents a metropolitan area with a relatively high concentration of businesses and points of interest, the first leaf node 504 can be in a layer which is deep down in the map data tree 302. The first leaf node 504 for such an area can be small, so as to adapt to the limitation on the number of data points in the leaf nodes.

Conversely, if the first leaf node 504 represents a rural area with a lower concentration of businesses and points of interest, the first leaf node 504 can be in a higher layer of the map data tree 302. The first leaf node 504 for such an area can cover a larger geographic area, so as to adapt to the limitation on the number of data points in the leaf nodes.

The map data tree 302 can provide means for a unique identification of all data points. The construct tree module 304 can construct the map data tree 302 of the source data 204 with a location identification associated with each data point of the source data 204. The location identification for a data point can consist of identifiers of the successive nodes of the path from the root 502 to the leaf node, which includes the data point, and a sequential identification of the data point within the leaf node.

As an example, the first location instance 506 can be identified by a path from the root 502 to the first leaf node 504, and a sequential identification of the first location instance 506 to distinguish it from other location instances of the first leaf node 504. A first location identification 508 can include a character string to identify the distinct node in each successive layer on the path from the root 502 to the first leaf node 504. The succession of nodes from the root 502 to the first leaf node 504, plus the sequential identification of the first location instance 506 in the first leaf node 504 can be a unique identification, such as the first location identification 508 for the first location instance 506 of the source data 204.

The length of the unique identification can be determined by the depth of the location instance in the map data tree 302. For example, the first location instance 506 can be identified with a binary scheme in the first location identification 508. An eight-bit byte can represent a path of up to four layers in the map data tree 302. A data point deeper in the map data tree 302 can require two or more bytes according to this scheme. An enhancement to the scheme can be to use the first two bits of a byte to indicate whether the byte can be the last byte in the identification, or whether there is a subsequent byte.

The map data tree 302, coupled with the location identification, such as the first location identification 508, provides a means of uniquely identifying each data point in the map data tree 302. It has been discovered that the identification, such as the first location identification 508, enables the navigation system 200 to quickly traverse the data structure to a desired data point or node. This can be an important characteristic for the navigation system 200 in a moving vehicle, for example, where rapid retrieval and display of navigation location information can be essential for a useful system.

For example, as the vehicle with the navigation system 200 moves from one location to another, the navigation location information relevant to the device location can also change. The navigation system 200 needs to reflect the changing information by retrieving and displaying different navigation location information. The navigation system 200 can retrieve and display the requested information with a response time necessary for a location-based system.

It has also been discovered that location identification in the map data tree 302 can provide an identification scheme which is compact, while requiring a relatively small storage space in a storage device of the navigation system 200. The compact storage of the map data tree 302 can enable the deployment of the navigation system 200 on smaller devices which might not otherwise support a system with the performance of the navigation system 200. For example, devices such as a netbook, a cellular phone, or a personal digital assistant can store the map data tree 302, which was challenging in older systems.

Figure 6:
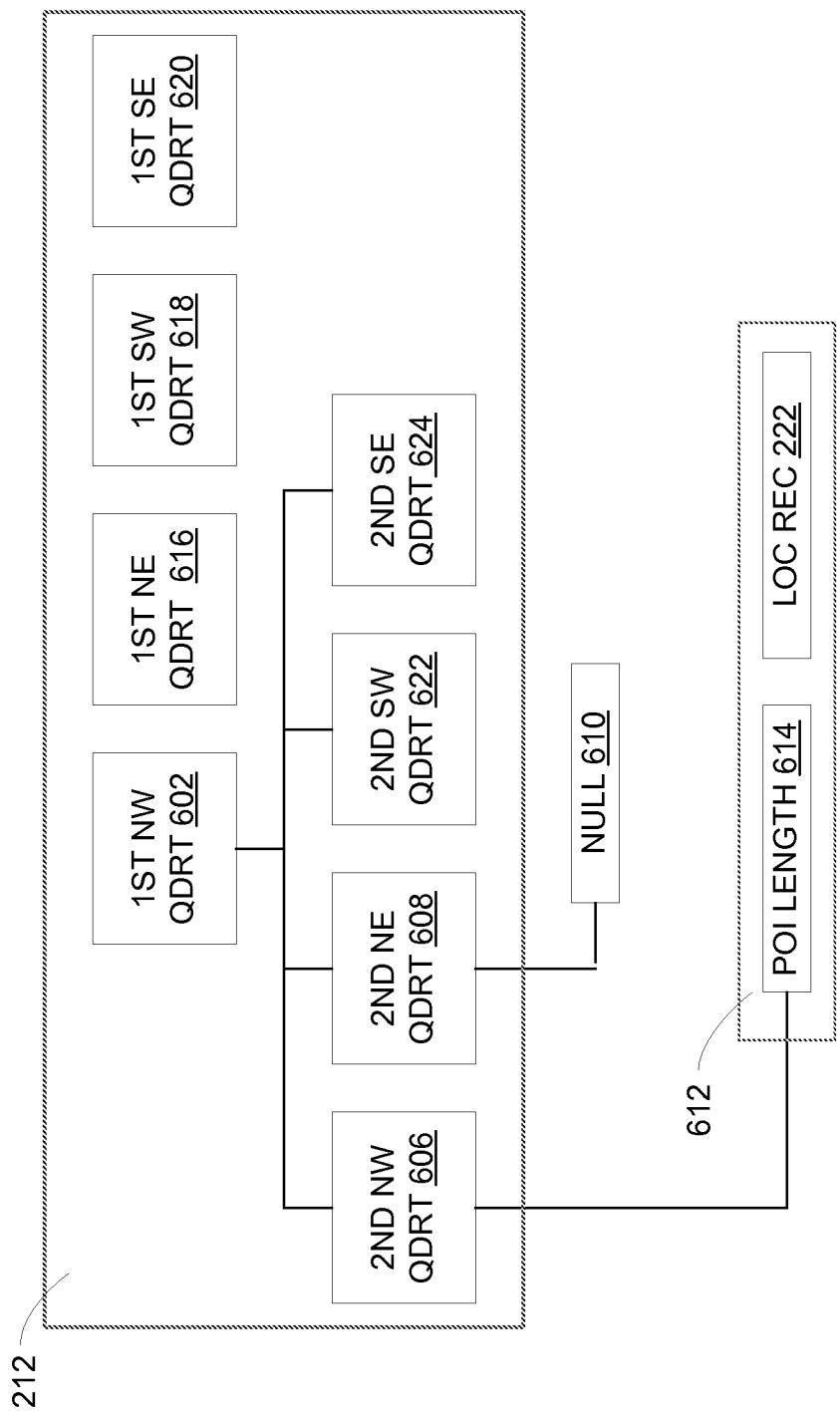
FIG. 6 is an illustration of a nested spatial index.

Referring now to FIG. 6, therein is shown an illustration of the nested spatial index 212. The nested spatial index 212 can be a tree structure, such as a quad-tree, an R-tree, or a KD-tree, matching the map data tree 302. As the nested spatial index 212 can be the same kind of structure as the map data tree 302, the location identification of any node or location, such as the first location identification 508, can apply to either the map data tree 302 or the nested spatial index 212.

For illustrative purposes, the illustration of the nested spatial index 212 shows two layers of a quad-tree representation of the nested spatial index 212. For example, four quadrants are shown in a layer of the quad-tree including a first northwest quadrant 602. In the next layer, the first northwest quadrant 602 can be further divided into four quadrants including a second northwest quadrant 606, and a second northeast quadrant 608. FIG. 6 also shows, as examples, a first northeast quadrant 616, a first southwest quadrant 618, a first southeast quadrant 620, a second southwest quadrant 622, and a second southeast quadrant 624.

The second northwest quadrant 606 can have a link from the nested spatial index 212 to a record list 612, which can include a POI length 614, and the location record 222. The POI length 614 can be an indication of the length of the record list 612, including the number of location records in the record list 612. For example, the record list 612 can include records other than the location record 222 and the POI length 614 can consider all records included with the record list 612. The index module 306 of FIG. 3 can generate the link from the nested spatial index 212 to the record list 612, including the location record 222.

The location record 222 can include navigation location information for a location instance, such as the first location instance 506 of FIG. 5. The location record 222 can be included in the record list 612 because the location record 222 can be associated with the first location instance 506, which in turn can be associated with the first inverted term 410.

The second northeast quadrant 608 can have a link from the nested spatial index 212 to a null 610. The link to the null 610 can indicate that there are no location instances associated with the first inverted term 410 in the geographic region covered by the second northeast quadrant 608.

The location record 222 can be identified with the first location identification 508 of FIG. 5, at the first location instance 506. The index module 306 can generate the unique identification for each point of interest of the source data 204. For example, the index module 306 can generate the first location identification 508 of the location record 222 in the nested spatial index 212.

The nested spatial index 212 can provide a compact data structure for efficient resolution of term searching for navigation location information. The nested spatial index 212 can include links to location records, which are specific to a term, such as the search term 216 of FIG. 2. Conventional applications can require a review of location records which are not specific to the search term 216 of FIG. 2 or the search range 218 of FIG. 2.

It has been discovered that the inverted term index 210 of FIG. 2 with the nested spatial index 212 can enable the navigation system 200 to review location records which are specific to the search term 216 and the search range 218. It has also been discovered that restricting the search with the sub-tree 404 can further improve the performance of a search for points of interest. These features can enable a more efficient system, with faster resolution of navigation location information.

Figure 7:
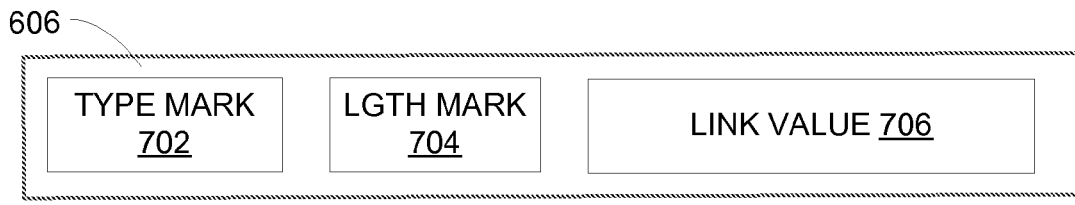
FIG. 7 is an illustration of a node of the nested spatial index.

Referring now to FIG. 7, therein is shown an illustration of a node of the nested spatial index 212 of FIG. 2. For example, the illustration can be the second northwest quadrant 606 of the nested spatial index 212. The nodes of the nested spatial index 212 of FIG. 6 can be link nodes. The link nodes can include a type mark 702, a length mark 704, and a link value 706.

The type mark 702 can indicate to the navigation system 200 of FIG. 2 whether the second northwest quadrant 606 is a link to another node, or a link to a record list, such as the record list 612 of FIG. 6. If the type mark indicates that the second northwest quadrant 606 is a link to another node, then the next node can be at a lower level in the quad-tree of the nested spatial index 212. If the type mark 702 indicates that the second northwest quadrant 606 is a link to a list such as the record list 612, then the link can identify the record list 612 in the map data tree 302.

The length mark 704 can indicate to the navigation system 200 whether the second northwest quadrant 606 can include the entire link. For example, if the link is too long to be expressed in a single byte, then the second northwest quadrant 606 can occupy two or more bytes. The length mark 704 can indicate whether the current byte of the second northwest quadrant 606 is the last byte of the link, or whether there is a subsequent byte of the link.

The link value 706 can be the value of the link. For example, if the link is to another node, the link value 706 is the location of the next node. If the link is to a record list such as the record list 612, the link value 706 is the link to the head of the record list 612. The term locate module 408 of FIG. 4 can select the location record 222, in the record list 612 in a link from the nested spatial index 212 associated with the location identification and the sub-tree 404 of FIG. 4.

For a binary system, a link node can occupy an eight-bit byte. For example, the type mark 702 can be one bit, the length mark can be one bit, and the link value can be six bits.

Figure 8:
FIG. 8 is an illustration of a term in an inverted term index with the nested spatial index.

Referring now to FIG. 8, therein is shown an illustration of a term in the inverted term index 210 with the nested spatial index 212. FIG. 8 shows the term with its associated nested spatial index 212. As an example, the term can be the first inverted term 410 of FIG. 4. The retrieval module 214 of FIG. 2 can locate a record, such as the first inverted term 410 with the nested spatial index 212 associated with a term, such as the search term 216 of FIG. 2.

The inverted term index 210 of FIG. 2 can have one or more terms listed in the index. Each term, such as the first inverted term 410, can have a unique nested spatial index, such as the nested spatial index 212. In FIG. 8, the first inverted term 410 can be associated with the nested spatial index 212 for finding locations of a named term in an identified area, such as the search term 216 of FIG. 2 in the search range 218 of FIG. 2.

Figure 9:
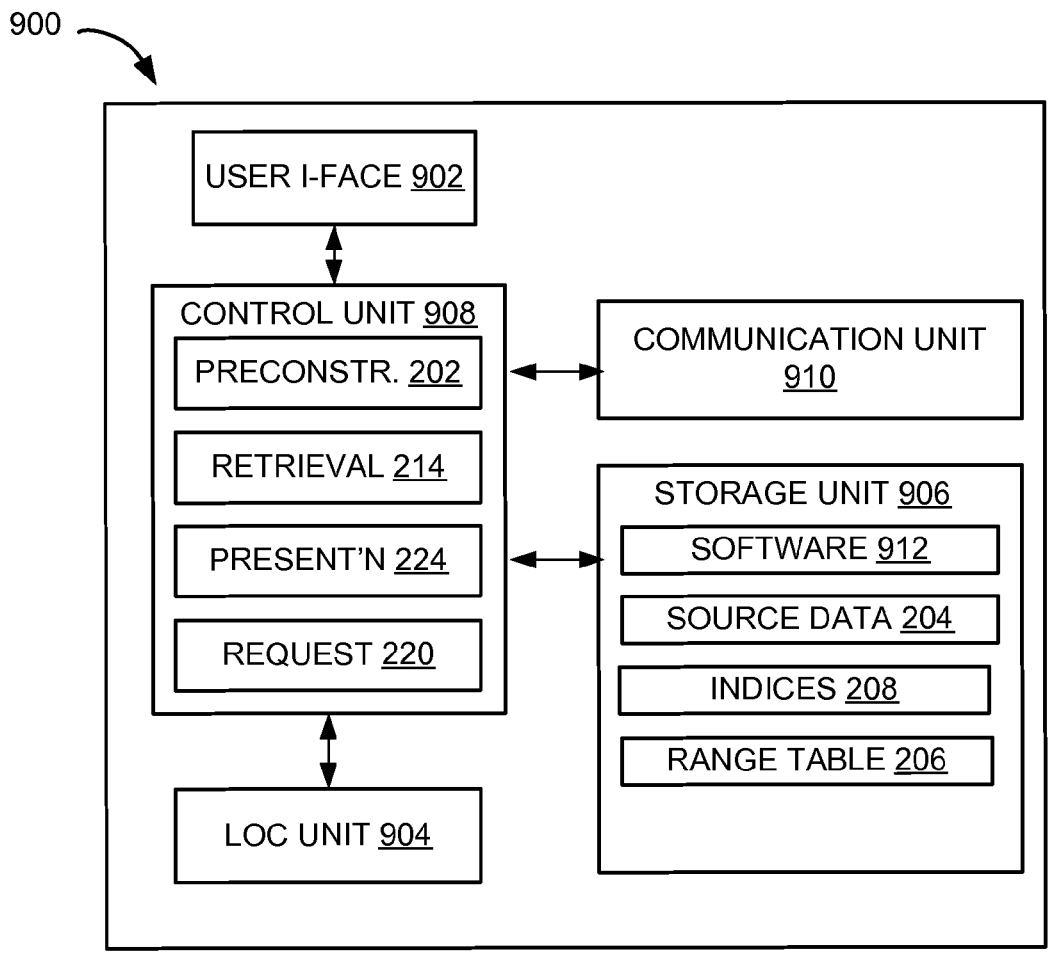
FIG. 9 is a block diagram of a device of the navigation system of FIG. 2 in a second embodiment of the present invention.

Referring now to FIG. 9, therein is shown a block diagram of a device 900 of the navigation system 200 of FIG. 2 in a second embodiment of the present invention. The device 900 can be the second device 104 of FIG. 1. For example, the device 900 can be any of a variety of devices, such as a cellular phone, a personal digital assistant, a notebook computer, or an entertainment device. The device 900 can be a standalone device, or can be incorporated with a vehicle, for example a car, truck, bus, or train.

As a further example, the device 900 can be a particularized machine, such as a mainframe, a server, a cluster server, a rack mounted server, or a blade server, or as more specific examples, an IBM System z10™ Business Class mainframe or a HP ProLiant ML™ server.

The device 900 can include a user interface 902, a location unit 904, a storage unit 906, a control unit 908, such as a processor, and a communication unit 910. The user interface 902 can include an input device and an output device. For example, the output device can include a display, a projector, a video screen, a speaker, or any combination thereof. Examples of the input device include a keypad, a touchpad, soft-keys, a keyboard, a microphone, or any combination thereof to provide data and communication inputs.

For illustrative purposes, the device 900 is described with discrete functional modules, although it is understood that the device 900 can have a different configuration. For example, the control unit 908, the communication unit 910, and the user interface 902 may not be discrete functional modules, but may have one or more of the aforementioned modules combined into one functional module. The communication unit 910 can include active or passive components, such as microelectronics or an antenna, for interaction with a communication channel such as the communication path 106 of FIG. 1.

The control unit 908 can execute software 912 and can provide the intelligence of the device 900. As an example, the software 912 can include the navigation system 200 of FIG. 2.

The control unit can operate the preconstruction module 202, including the construct tree module 304, the index module 306, and the assembly module 308. The control unit 908 can also operate the retrieval module 214, including the term locate module 408, the sub-tree module 402, and the matching module 406. The user interface 902 can operate the request module 220 and the presentation module 224.

The storage unit 906 can include the software 912, setup data, and other data of the navigation system 200. The control unit 908 can store the source data 204 in the storage unit 906. The control unit 908 can also store the indices 208 and the range table 206 in the storage unit 906.

The location unit 904 of the device 900 can receive a location reading of the device 900. The location unit 904 can be implemented in many ways. For example, the location unit 904 can be a navigational component providing a location reading, such as a global positioning system (GPS), inertial navigation system, cell-tower location system, accelerometer location system, or any combination thereof.

Figure 10:
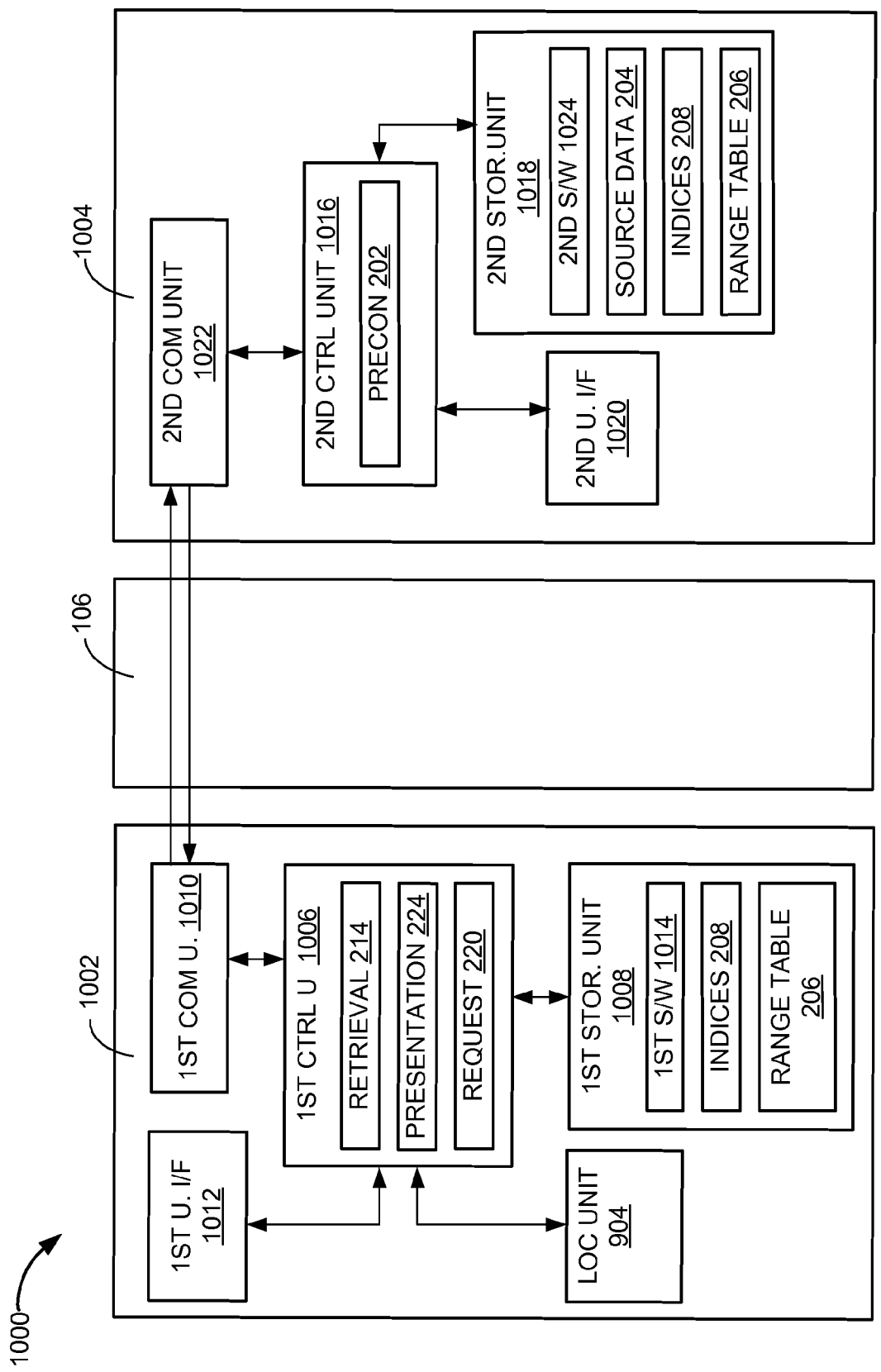
FIG. 10 is a block diagram of a navigation system with indexed term searching in a third embodiment of the present invention.

Referring now to FIG. 10, therein is shown a block diagram of a navigation system 1000 with indexed term searching in a third embodiment of the present invention. The navigation system 1000 can include a first device 1002, a second device 1004, and the communication path 106. The first device 1002 can communicate with the second device 1004 over the communication path 106.

For illustrative purposes, the navigation system 1000 is shown with the first device 1002 as a client, although it is understood that the navigation system 1000 can have the first device 1002 as a different type of device. For example, the first device 1002 can be a server.

Also for illustrative purposes, the navigation system 1000 is shown with the second device 1004 as a server, although it is understood that the navigation system 1000 can have the second device 1004 as a different type of device. For example, the second device 1004 can be a client.

As a further example, the first device 1002 can be a particularized machine, such as a portable computing device, a thin client, a notebook, a netbook, a smartphone, a personal digital assistant, or a cellular phone, and as specific examples, an Apple iPhone™, Palm Centro™, or Moto Q Global™. As yet another example, the second device 1004 can be a particularized machine, such as a mainframe, a server, a cluster server, a rack mounted server, or a blade server, or as more specific examples, an IBM System z10™ Business Class mainframe, or a HP ProLiant ML™ server.

For brevity of description for this embodiment of the present invention, the first device 1002 will be described as a client device and the second device 1004 will be described as a server device. The present invention is not limited to this selection for the type of devices. The selection is an example of the present invention.

The first device 1002 can include, for example, a first control unit 1006, such as a processor, a first storage unit 1008, a first communication unit 1010, the location unit 904, and the first user interface 1012. For illustrative purposes, the navigation system 1000 is shown with the first device 1002 described with discrete functional modules, although it is understood that the navigation system 1000 can have the first device 1002 in a different configuration. For example, the first control unit 1006, the first communication unit 1010, and the first user interface 1012 may not be discrete functional modules, but may have one or more of the aforementioned modules combined into one functional module.

The first control unit 1006 can execute first software 1014 from the first storage unit 1008 and provide the intelligence of the first device 1002. As an example, the first software 1014 can include a portion of the navigation system 200 of FIG. 2. For illustrative purposes, the first control unit 1006 is shown with the retrieval module 214, the request module 220, and the presentation module 224.

The first storage unit 1008 can be implemented in a number of ways. For example, the first storage unit 1008 can be a volatile memory, a nonvolatile memory, an internal memory, or an external memory. The first storage unit 1008 can include the first software 1014, setup data, and other data of the navigation system 1000. The first control unit 1006 can store the inverted term index 210 of FIG. 2 with the nested spatial index 212 of FIG. 2 and the range table 206 in the first storage unit 1008.

The first user interface 1012 can include an output device and an input device. For example, an output device can include a projector, a video screen, a speaker, or any combination thereof. Examples of the input device include a keypad, a touchpad, soft-keys, a keyboard, a microphone, or any combination thereof to provide data and command inputs.

The location unit 904 of the first device 1002 can obtain a location reading of the navigation system 1000. The location unit 904 can be implemented in many ways. For example, the location unit 904 can be a navigational component providing a location reading, such as a global positioning system (GPS), inertial navigation system, cell-tower location system, accelerometer location system, or any combination thereof.

The first communication unit 1010 can include active or passive components, such as microelectronics or an antenna, for interaction with the communication path 106. The first control unit 1006 can execute the first software 1014 and can provide the intelligence of the first device 1002 for interaction with the second device 1004, the first user interface 1012, the communication path 106 via the first communication unit 1010, and interaction to the location unit 904.

The second device 1004 can include, for example, a second control unit 1016, such as a processor or computer, a second storage unit 1018, a second user interface 1020, and a second communication unit 1022. For illustrative purposes, the navigation system 1000 is shown with the second device 1004 described with discrete functional modules, although it is understood that the navigation system 1000 can have the second device 1004 in a different configuration. For example, the second control unit 1016 and the second communication unit 1022 may not be discrete functional modules, but may have one or more of the aforementioned modules combined into one functional module.

The second storage unit 1018 can include second software 1024 of the second device 1004, the source data 204, the inverted term index 210 with the nested spatial index 212, and the range table 206. As an example, the second software 1024 can include a portion of the navigation system 200 of FIG. 2. For illustrative purposes, the second storage unit 1018 is shown as a single element, although it is understood that the second storage unit 1018 can be a distribution of storage elements.

Also for illustrative purposes, the navigation system 1000 is shown with the second storage unit 1018 as a single hierarchy storage system, although it is understood that the navigation system 1000 can have the second storage unit 1018 in a different configuration. For example, the second storage unit 1018 can be formed with different storage technologies forming a memory hierarchal system including different levels of caching, main memory, rotating media, or off-line storage.

The first communication unit 1010 can couple with the communication path 106 to send information to the second device 1004. The second device 1004 can receive information from the communication path 106 in the second communication unit 1022. The second communication unit 1022 can couple with the communication path 106 to send information to the first device 1002. The first device 1002 can receive information from the communication path 106 in the first communication unit 1010. The navigation system 1000 can be executed by the first control unit 1006, the second control unit 1016, or a combination thereof.

The second control unit 1016 can store the source data 204 in the second storage unit 1018. The second control unit 1016 can operate the preconstruction module 202 to preconstruct the range table 206 and the inverted term index 210 with the nested spatial index 212. The second control unit 1016 can also store the inverted term index 210 with the nested spatial index 212 and the range table 206 in the second storage unit 1018.

The second control unit 1016 can operate the second communication unit 1022 to send the inverted term index 210 with the nested spatial index 212 and the range table 206 over the communication path 106 to the first device 1002. The second control unit 1016 can also store the inverted term index 210 with the nested spatial index 212 and the range table 206 in the second storage unit 1018.

The first control unit 1006 can operate the first communication unit 1010 to receive the inverted term index 210 with the nested spatial index 212 and the range table 206 from the communication path 106. The first control unit 1006 can store the inverted term index 210 with the nested spatial index 212 and the range table 206 in the first storage unit 1008.

The first user interface 1012 can provide the search term 216 of FIG. 2 and the search range 218 of FIG. 2. The first control unit 1006 can operate the retrieval module 214 to retrieve the location record 222 of FIG. 2, for the search term 216 and the search range 218. The first control unit 1006 can access the range table 206 and the inverted term index 210 with the nested spatial index 212 to retrieve the location record 222. The first control unit 1006 can also couple to the first user interface 1012 to operate the presentation module 224 to display information from the location record 222 on the first device 1002.

In this example, the first control unit 1006 can operate the retrieval module, the first user interface 1012 can operate the request module 220 and the presentation module 224, and the second control unit 1016 can operate the preconstruction module 202. However, it is understood that this is an example partition, and that the modules of the navigation system 1000 can be operated in other partitions. For example, in a different partition, the first control unit 1006 can operate the preconstruction module 202, the second control unit 1016 can operate the retrieval module 214, and the second user interface 1020 can operate the request module 220 and the presentation module 224.

Figure 11:
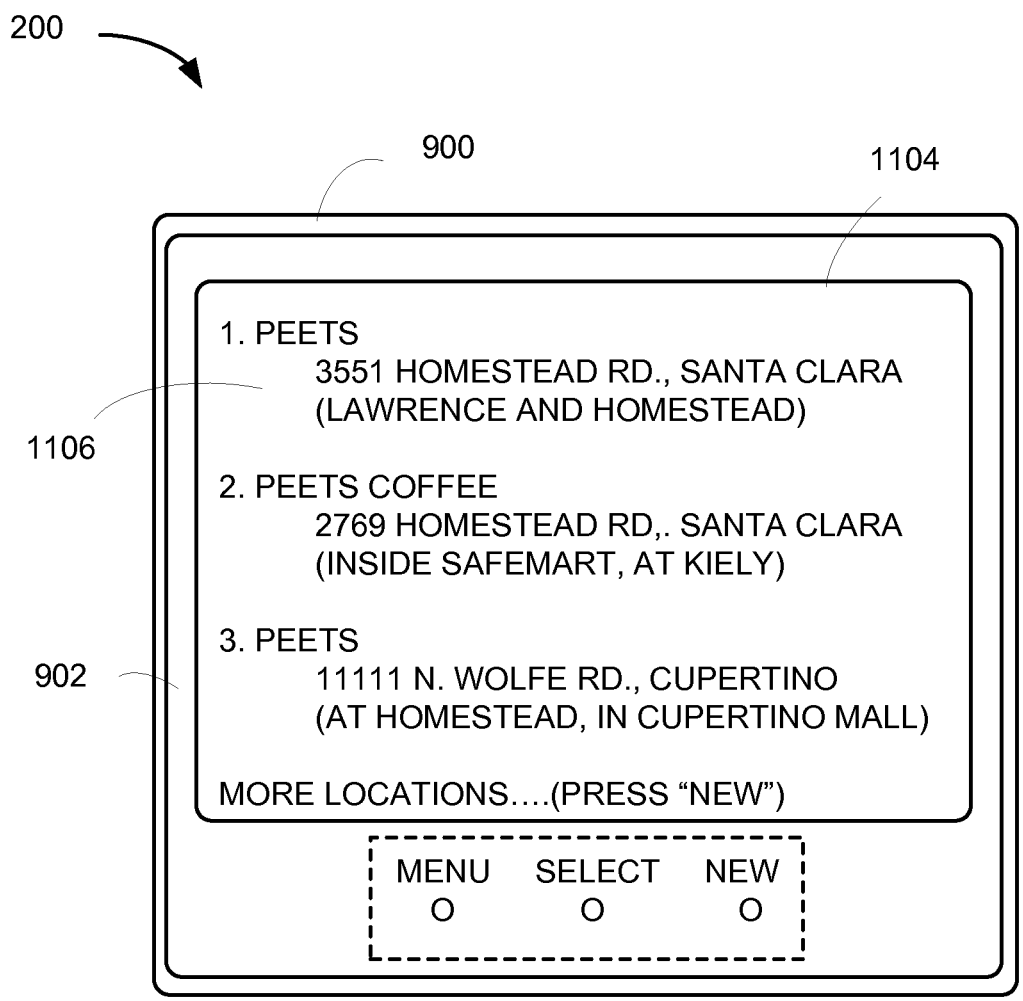
FIG. 11 is an illustration of an example application of the navigation system with indexed term searching.

Referring now to FIG. 11, therein is shown an illustration of an example application of the navigation system 200 with indexed term searching. The navigation system 200 is shown operating on the device 900 with the user interface 902. The user interface 902 can include an input device and an output device. For example, the output device can include a display 1104, a projector, a video screen, a speaker, or any combination thereof. Examples of the input device include a keypad, a touchpad, soft-keys, a keyboard, a microphone, or any combination thereof to provide data and communication inputs.

The illustration shows information returned on the display 1104 in response to a request for information on a term. For example, the search term 216 of FIG. 2 can be "Peet's", and the search range 218 can be the city of Santa Clara, Calif. The navigation system 200 can operate the retrieval module 214 of FIG. 2 to retrieve the information using the inverted term index 210 of FIG. 2 with the nested spatial index 212 of FIG. 2. The presentation module 224 of FIG. 2 can operate on a record, such as the location record 222 of FIG. 2, to display information relevant to the location. The illustration shows a listing 1106 on the display 1104 of three locations which match the request, with further such results available.

Figure 12:
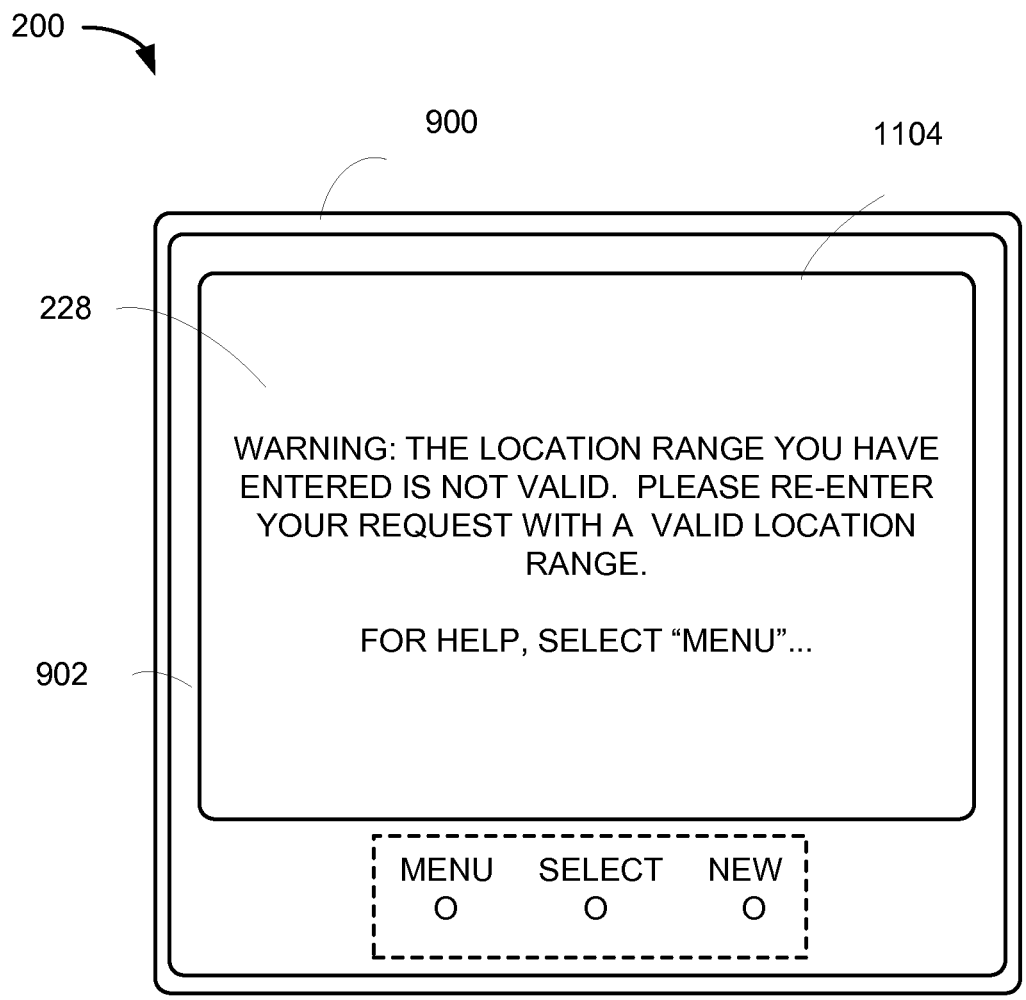
FIG. 12 is an illustration of a second example application of the navigation system with indexed term searching.

Referring now to FIG. 12, therein is shown an illustration of a second example application of the navigation system 200 with indexed term searching. The illustration shows the device 900 with the user interface 902 with the display 1104. The illustration shows an example of the range advisory 228, wherein the navigation system 200 determines that the search range 218 of FIG. 2 is not covered by the source data 204. For example, for source data covering the forty-eight contiguous states of the USA, if the search range 218 is a different state or country, an advisory, such as the range advisory 228 on the illustration, can be retrieved and displayed. The range advisory 228 can include a recommendation for a successful search.

Figure 13:
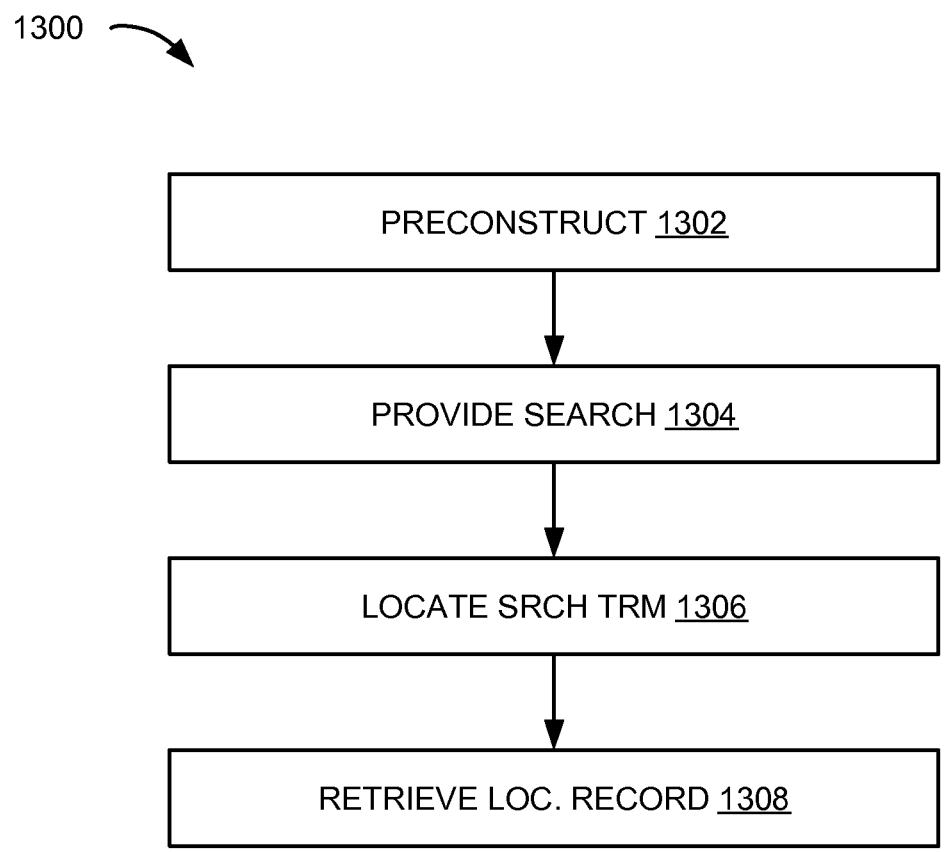
FIG. 13 is a flow chart of a method of operation of the navigation system with indexed term searching in a further embodiment of the present invention.

Referring now to FIG. 13, therein is shown a flow chart of a method 1300 of operation of the navigation system 200 with indexed term searching in a further embodiment of the present invention. The method 1300 includes: preconstructing an inverted term index having a nested spatial index of at least one location in a block 1302; providing a search term and a search range for searching the inverted term index in a block 1304; locating the search term in the inverted term index and having the nested spatial index bounded by the search range in a block 1306; and retrieving a location record linked to the nested spatial index and associated with the search term and the search range for displaying on a device in a block 1308.

Another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving an inverted term index extracted from a map data tree including a nested spatial index with nodes, wherein the map data tree represents a physical geographic region and the nodes represent a physical geographic area within the map data tree;
   receiving a search term and a search range for searching the inverted term index;
   selecting with a control unit one or more nodes within the nested spatial index corresponding to the search range;
   locating the search term in the inverted term index; and
   retrieving a location record linked to the nested spatial index and associated with the search term from within the one or more nodes corresponding to the search range for displaying on a device.

2. The method as claimed in claim 1 wherein receiving the inverted term index includes generating a link from the nested spatial index to a record list including the location record.

3. The method as claimed in claim 1 wherein retrieving the location record includes generating an error advisory for displaying on the device.

4. The method as claimed in claim 1 wherein retrieving the location record includes generating a range advisory for displaying on the device.

5. The method as claimed in claim 1 wherein displaying the location record on the device includes sorting location records according to a sort preference.

6. A method of operation of a navigation system comprising:
   preconstructing an inverted term index, extracted from a map data tree, including a nested spatial index with nodes, wherein the map data tree represents a physical geographic region and the nodes represent a physical geographic area within the map data tree;
   providing a search term and a search range for searching the inverted term index;
   selecting with a control unit a sub-tree of the nested spatial index corresponding to the search range for restricting a search, the sub-tree for representing one or more nodes within the nested spatial index;
   locating the search term in the inverted term index;
   retrieving a location record linked to the nested spatial index and associated with the search term from within the sub-tree corresponding to the search range for displaying on a device.

7. The method as claimed in claim 6 wherein preconstructing the inverted term index having the nested spatial index includes generating a first location identification of the location record in the nested spatial index.

8. The method as claimed in claim 6 wherein selecting the sub-tree of the nested spatial index includes selecting a set of nodes of the nested spatial index representing a geographic area bounded by the search range.

9. The method as claimed in claim 6 wherein retrieving the location record includes:
   traversing the nested spatial index associated with the search term to the sub-tree of the nested spatial index; and
   selecting the location record in a record list in a link from the nested spatial index.

10. The method as claimed in claim 6 wherein retrieving the location record includes omitting the location record, which is included in the sub-tree and not included in the search range.

11. A navigation system comprising:
    a user interface configured to receive a search term and a search range for searching an inverted term index;
    a control unit, coupled to the user interface, configured to:
       receive the inverted term index, extracted from a map data tree, including a nested spatial index with nodes, wherein the map data tree represents a physical geographic region and the nodes represent a physical geographic area within the map data tree;
    select one or more nodes within the nested spatial index corresponding to the search range;
    locate the search term in the inverted term index; and
    locate a location record linked to the nested spatial index and associated with the search term from within the one or more nodes corresponding to the search range for displaying on a device.

12. The system as claimed in claim 11 wherein the control unit is configured to generate a link from the nested spatial index to a record list having the location record.

13. The system as claimed in claim 11 wherein the control unit is configured to generate an error advisory for displaying on the device.

14. The system as claimed in claim 11 wherein the control unit is configured to generate a range advisory for displaying on the device.

15. The system as claimed in claim 11 wherein the user interface is configured to sort location records according to a sort preference.

16. The system as claimed in claim 11 wherein the control unit is configured to:
   preconstruct the inverted term index; and
   select a sub-tree of the nested spatial index including the one or more nodes for restricting a search.

17. The system as claimed in claim 16 wherein the control unit is configured to generate a first location identification of the location record in the nested spatial index.

18. The system as claimed in claim 16 wherein the control unit is configured to select a set of nodes of the nested spatial index representing a geographic area bounded by the search range.

19. The system as claimed in claim 16 wherein the control unit is configured to traverse the nested spatial index associated with the search term to the sub-tree, and for selecting the location record in a record list in a link from the nested spatial index.

20. The system as claimed in claim 16 wherein the control unit is configured to omit the location record which is included in the sub-tree and not included in the search range.

* * * * *